United States Patent
Yang

(10) Patent No.: US 10,087,845 B2
(45) Date of Patent: Oct. 2, 2018

(54) PRESSURE DAMPING DEVICE FOR FUEL MANIFOLD

(71) Applicant: General Electric Company, Schenectady, NY (US)

(72) Inventor: Xilin Yang, Blue Ash, OH (US)

(73) Assignee: General Electric Company, Schenectady, NY (US)

(*) Notice: Subject to any disclaimer, the term of this patent is extended or adjusted under 35 U.S.C. 154(b) by 113 days.

(21) Appl. No.: 14/954,658

(22) Filed: Nov. 30, 2015

(65) Prior Publication Data

US 2017/0153027 A1 Jun. 1, 2017

(51) Int. Cl.
*F02C 7/24* (2006.01)
*F23R 3/00* (2006.01)
*F23R 3/34* (2006.01)
*F02C 7/22* (2006.01)

(52) U.S. Cl.
CPC ............ *F02C 7/24* (2013.01); *F02C 7/222* (2013.01); *F23R 3/002* (2013.01); *F23R 3/34* (2013.01); *F05D 2260/963* (2013.01); *F23R 2900/00014* (2013.01); *Y02T 50/671* (2013.01)

(58) Field of Classification Search
CPC .... F02C 7/22; F02C 7/222; F02C 9/26; F02C 7/228; F02C 7/232; F02C 9/263; F02C 7/24; F23R 2900/00014; F23R 2900/00013; F23R 3/002
See application file for complete search history.

(56) References Cited

U.S. PATENT DOCUMENTS

| | | |
|---|---|---|
| 3,049,139 A | 8/1962 | Thompson et al. |
| 4,312,185 A | 1/1982 | Nash et al. |
| 5,369,952 A | 12/1994 | Walters |
| 5,564,678 A | 10/1996 | Watson |
| 6,058,709 A | 5/2000 | Richards et al. |
| 6,742,504 B2 | 6/2004 | Seymour, II et al. |
| 6,905,002 B2 | 6/2005 | Bagga et al. |
| 6,948,585 B2 | 9/2005 | Lei et al. |
| 8,820,086 B2 | 9/2014 | Bailey et al. |
| 2003/0234003 A1 | 12/2003 | Seymour, II et al. |
| 2003/0234138 A1 | 12/2003 | Bagga et al. |
| 2004/0149513 A1 | 8/2004 | Lei et al. |
| 2006/0000220 A1 | 1/2006 | Sattinger |
| 2007/0137209 A1* | 6/2007 | Prociw .............. F02C 7/222 60/772 |
| 2008/0289314 A1* | 11/2008 | Snider ............... F02C 7/222 60/39.23 |
| 2010/0018208 A1* | 1/2010 | Ritland .............. F02C 7/222 60/737 |

(Continued)

FOREIGN PATENT DOCUMENTS

WO 2014/173660 A1 10/2014

OTHER PUBLICATIONS

Extended European Search Report and Opinion issued in connection with corresponding EP Application No. 16198371.3 dated Apr. 7, 2017.

*Primary Examiner* — Craig Kim
(74) *Attorney, Agent, or Firm* — General Electric Company; Pamela Kachur

(57) ABSTRACT

A manifold pressure damping assembly that includes one or more closed volumes coupled in flow communication with a manifold through one or more flow restrictors is provided.

17 Claims, 4 Drawing Sheets

(56) References Cited

U.S. PATENT DOCUMENTS

| | | | |
|---|---|---|---|
| 2011/0048021 A1* | 3/2011 | Slobodyanskiy | F01D 9/023 |
| | | | 60/725 |
| 2012/0137690 A1 | 6/2012 | Sardeshmukh | |
| 2013/0167954 A1* | 7/2013 | Bailey | F02C 7/222 |
| | | | 137/561 A |
| 2014/0060063 A1 | 3/2014 | Boardman et al. | |
| 2014/0196458 A1 | 7/2014 | Ito et al. | |
| 2014/0310959 A1 | 10/2014 | Fiebig et al. | |

\* cited by examiner

PRESSURE DAMPING DEVICE FOR FUEL MANIFOLD

BACKGROUND

The field of the disclosure relates generally to turbofan engines and, more particularly, to a method and system for suppressing resonance in fuel manifolds of turbofan engines.

Under certain operating conditions, turbofan engines experience high-frequency fuel flow oscillations into the combustor associated with fuel-coupled combustor dynamics that may negatively impact engine performance. Typically, fuel-coupled combustor dynamics may occur when combustor discharge pressure, vibration of the fuel manifold, in particular in the tangential direction, and the fuel pressure pulsation within the fuel manifold may resonate with one another and form an instability loop. For instance, when the combustor operates at low combustor discharge temperature with high main flow split, combustor discharge pressure may have high amplitude at acoustic frequency range, which drives vibration of the engine including the fuel manifolds. The vibration of the fuel manifolds in the tangential direction in turn drives high amplitude manifold pressure oscillations which in turn drive high amplitude fuel flow oscillations into the combustor.

One existing strategy to mitigate the effects of fuel-coupled combustor dynamics is to limit the amount of main fuel flow into the combustor to avoid operation within the acoustic zone. However this approach may impact emissions and Specific Fuel Consumption (SFC), thereby degrading the operational efficiency of the engine. In addition, the identification of operational parameters suitable for avoiding undesired acoustics is typically mapped empirically through engine testing. Although margins of error are typically incorporated into the resulting maps, the engine is still vulnerable to engine to engine variations, operating environment, fuel property variations, etc.

Other existing strategies incorporate devices that actively tune fuel manifold pressure frequency or directly modify combustion processes to mitigate the effects of fuel-coupled combustor dynamics. However, such devices add weight and cost to the engine and associated aircraft, and may additionally impact engine performance.

BRIEF DESCRIPTION

In one aspect, a manifold pressure damping assembly includes one or more closed volumes coupled in flow communication with a manifold through one or more flow restrictors.

In another aspect, a method of damping pressure fluctuations within a manifold includes coupling one or more closed volumes in flow communication with the manifold through one or more flow restrictors.

In yet another aspect, a turbofan engine includes a manifold pressure damping assembly. The manifold pressure damping assembly includes one or more closed volumes coupled in flow communication with a manifold through one or more flow restrictors. The manifold includes a first end, an opposing second end and an elongate header extending therebetween. The header includes one or more inlet openings coupled in flow communication with a source of fuel distributed by the header. The header further includes one or more output openings configured to distribute the fuel to one or more respective fuel nozzles

DRAWINGS

These and other features, aspects, and advantages of the present disclosure will become better understood when the following detailed description is read with reference to the accompanying drawings in which like characters represent like parts throughout the drawings, wherein.

Figure 1:
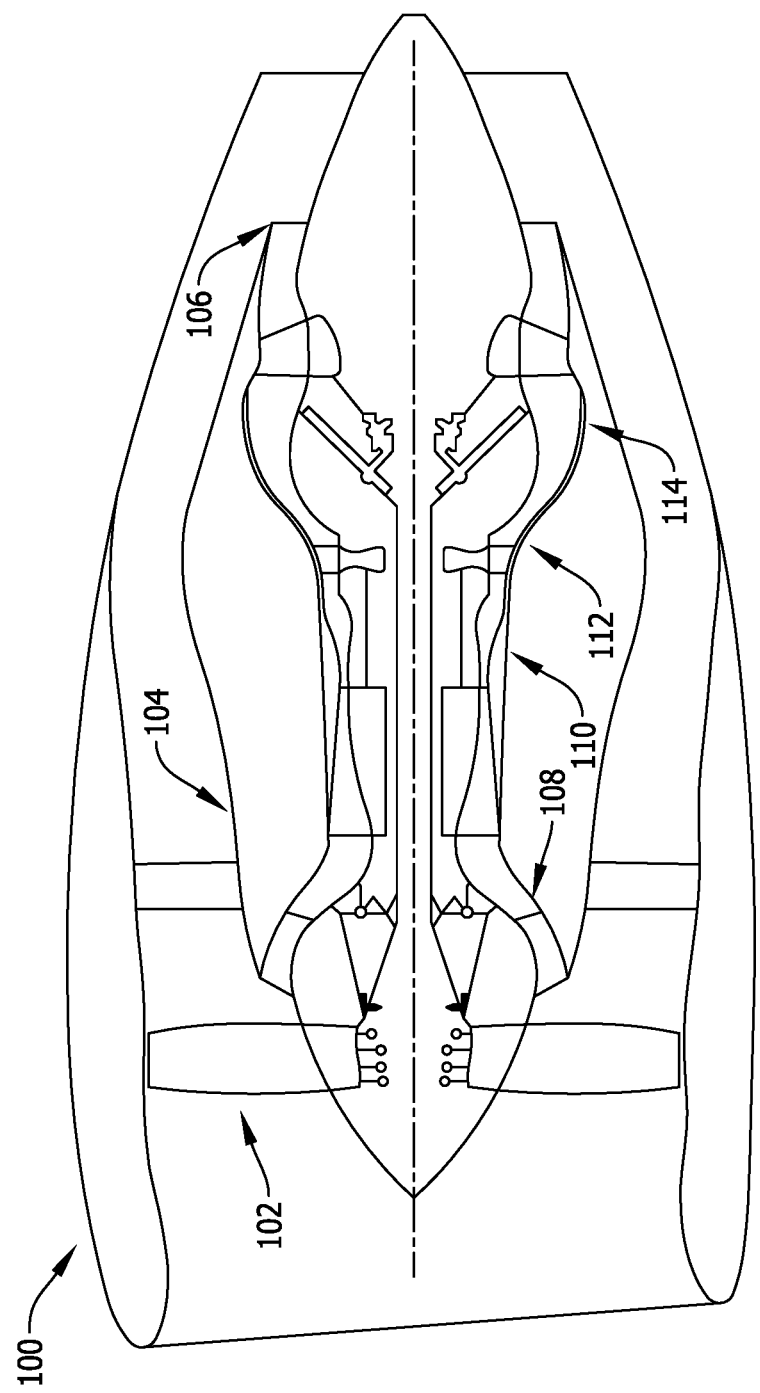
FIG. 1 is a schematic illustration of an exemplary of an exemplary turbofan engine.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of a manifold pressure damping assembly described herein provide a cost-effective method for damping high-frequency fuel flow oscillations within a fuel manifold of a combustor of a turbofan engine associated with fuel-coupled combustor dynamics. The manifold pressure damping assembly includes one or more closed volumes coupled in flow communication with the manifold through one or more flow restrictors. The manifold pressure damping assembly operates passively without need for additional control or modulation of any kind, as the one or more closed volumes and the one or more flow restrictors are sized and positioned on the manifold in order to dampen pressure oscillations within a desired frequency range at a suitable location within the manifold as described in additional detail herein below. The simplicity and relatively small size of the elements of the manifold pressure damping assembly render this assembly suitable for incorporation into a variety of engine fuel manifolds and other manifolds associated with supplying fluids from a supply to one or more loads. Incorporation of the manifold pressure damping assembly into a fuel manifold of a turbofan engine enables the operation of the engine relatively free of operational limitations associated with avoiding high-frequency fuel-coupled combustor dynamics, thereby reducing the need to manage fuel-coupled acoustics through engine controller software and additionally enhancing operational efficiency of the engine. This is achieved by breaking the instability loop formed by the combustor, the engine vibration and the fuel manifold.

FIG. 1 is a schematic illustration of an exemplary gas turbine engine 100. Gas turbine engine 100 includes a fan system 102, a core system 104, and an exhaust system 106 arranged in axial flow communication with one another. Core system 104 includes a compressor assembly 108, a combustion assembly 110, a high pressure turbine assembly 112, and a low pressure turbine assembly 114. During operation, air is directed into compressor assembly 108, and the air is compressed and is then directed into combustion assembly 110. Within combustion assembly 110, the compressed air is mixed with fuel and ignited to generate combustion gas, and the combustion gas is subsequently directed through high pressure turbine assembly 112 and low pressure turbine assembly 114 for discharge into the ambient air via exhaust system 106. In other embodiments, gas turbine engine 100 may include any suitable fan system, core system, and/or exhaust system configured in any suitable manner.

Figure 2:
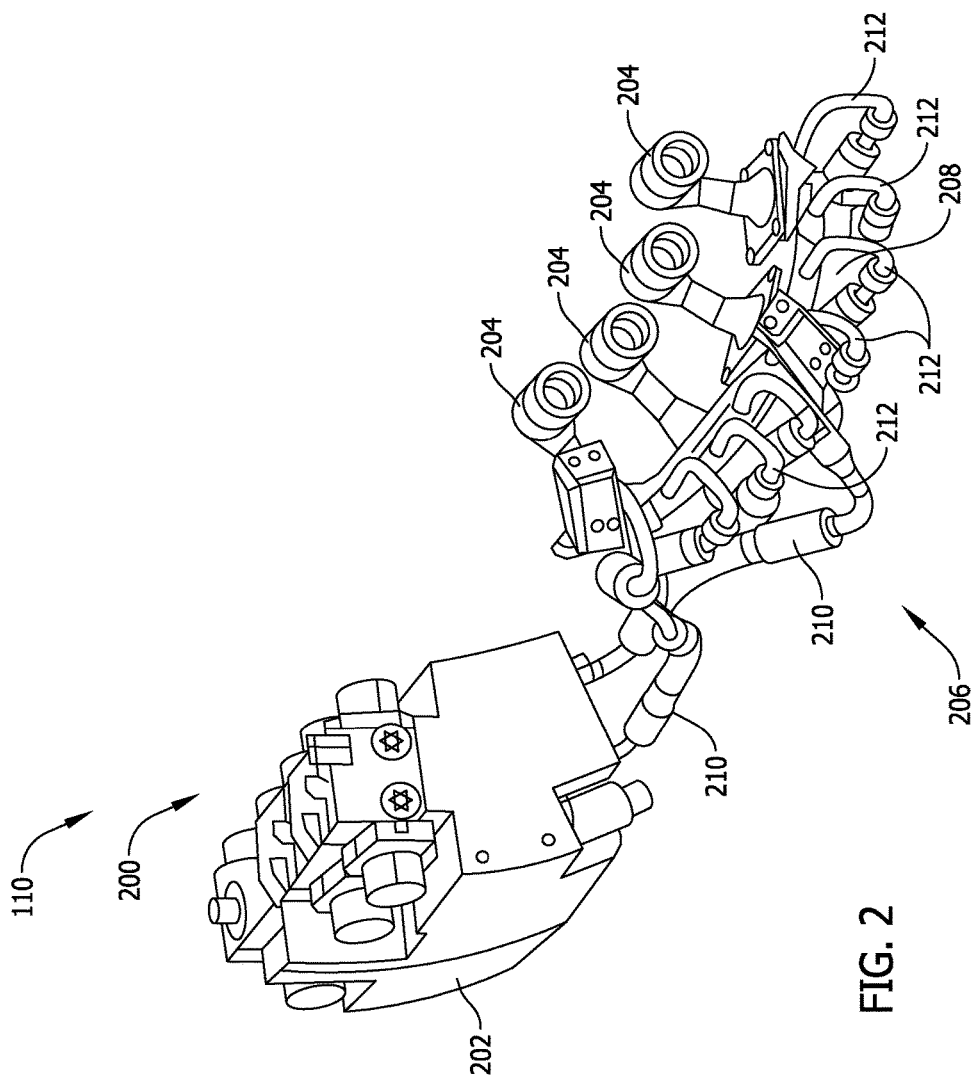
FIG. 2 is a perspective view of a fuel circuit of a fuel delivery system.

FIG. 2 is a perspective view of a fuel delivery system 200 of combustion assembly 110. Fuel delivery system 200 includes a fuel control valve 202, fuel nozzles 204, and an arrangement 206 of fuel conduits coupling control valve 202 in flow communication with at least one nozzle 204. Control valve 202 is also coupled in flow communication to a fuel source (not shown). In other embodiments, fuel delivery system 200 may be configured in any suitable manner.

Fuel conduit arrangement 206 includes a manifold 208, a plurality of manifold inlet conduits 210, and a plurality of manifold outlet conduits 212. In the exemplary embodiment, each manifold outlet conduit 212 is configured for coupling in flow communication to one corresponding nozzle 204. Fuel from fuel source is channeled to nozzles 204 via manifold inlet conduits 210, manifold 208, and manifold outlet conduits 212. In various embodiments, fuel conduit arrangement 206 may have any suitable number of conduits and manifolds fabricated from any suitable materials and arranged in any suitable manner for delivering any suitable fuel flow. Alternatively, conduit arrangement 206 described herein, in particular manifold 208, may be suitable for uses other than fuel delivery in turbofan engine 100.

Figure 3:
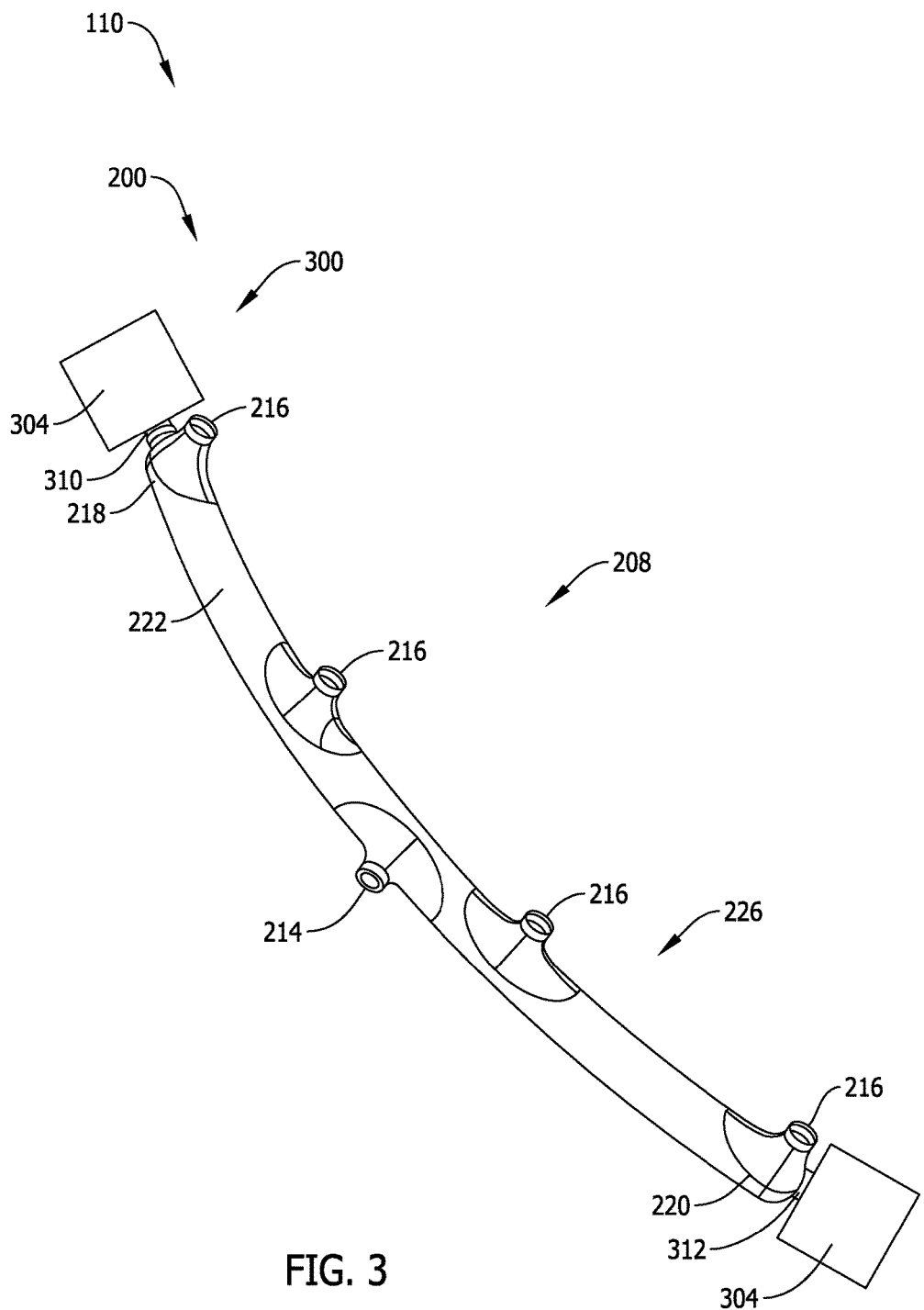
FIG. 3 is a perspective view of a manifold of the fuel circuit shown in FIG. 3.
Figure 4:
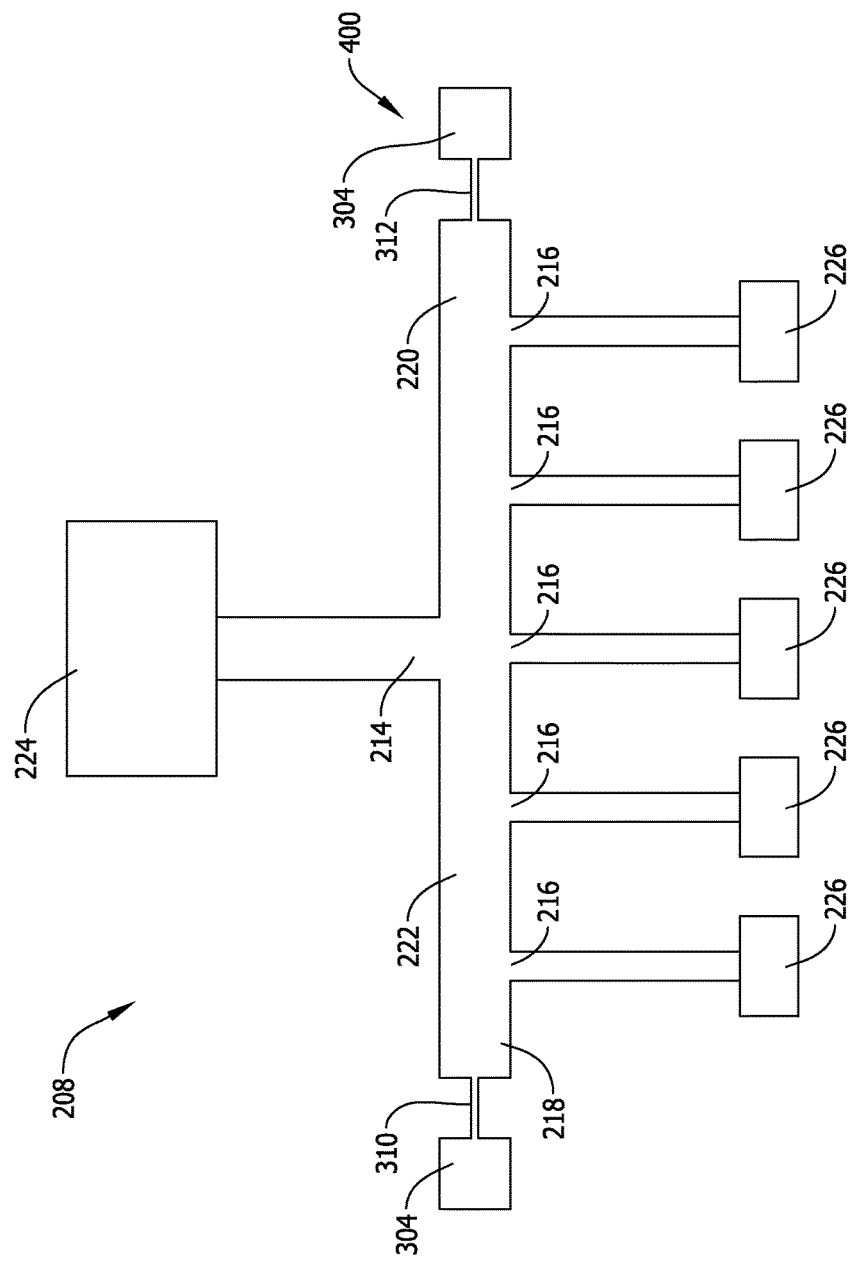
FIG. 4 is a schematic view of a manifold and a manifold pressure damping assembly.

FIG. 3 is a perspective view of manifold 208 in one embodiment, and FIG. 4 is a schematic diagram of manifold 208. Manifold 208 includes a first end 218, an opposing second end 220 and an elongate header 222 extending therebetween. In one embodiment, manifold 208 is arcuately shaped and header 222 includes an inlet opening 214 configured for coupling in flow communication to manifold inlet conduit 210, and a plurality of output openings 216 configured for coupling in flow communication to manifold outlet conduits 212. Alternatively, manifold 208 may have any suitable shape and may have any suitable number of ports arranged in any suitable manner for any suitable purpose.

Referring to FIG. 3, manifold pressure damping assembly 300 includes one or more closed volumes 304 coupled in flow communication with manifold 208 through one or more flow restrictors 310, 312. In various aspects, manifold pressure damping assembly 300 includes any number of closed volumes coupled at any location on header 220 of manifold 20 as needed without limitation. In one embodiment, one or more closed volumes and one or more flow restrictors 310, 312 are configured to dampen pressure oscillations within manifold 208 characterized by oscillation frequencies of greater than about 250 Hz. Without being limited to any particular theory, pressure oscillations associated with fuel-coupled combustor dynamics typically include oscillation frequencies above about 250 Hz. In another embodiment, manifold pressure damping assembly 300 is configured to dampen pressure oscillations within manifold 208 at frequencies greater than about 250 Hz without disrupting fuel flow to fuel nozzles 204.

In various aspects, the various elements of manifold pressure damping assembly 300 may be sized and located using known methods in order to dampen pressure oscillations within manifold 208 characterized by oscillation frequencies of greater than about 250 Hz. Without being limited to any particular theory, the design of manifold pressure damping assembly 300 may be influenced by characteristics of compressor assembly 108 and/or combustion assembly 110 including, but not limited to: frequency and amplitude of combustor acoustics; vibration characteristics of manifold such as resonance frequency; dimensions of manifold such volume, cross-sectional area, and/or length; cross-sectional area of manifold inlet conduits and/or of manifold outlet conduits; fuel pressure and/or flow rate; and ambient temperature.

In various embodiments, one or more factors characterizing manifold pressure damping assembly 300 may be modulated in order to enable damping of pressure oscillations within manifold 208 without restricting fuel flow. Non-limiting examples of factors characterizing manifold pressure damping assembly 300 suitable for manipulation include: number of closed volumes 302 coupled in flow communication with manifold 208; position of closed volumes 304 on header 222 of manifold 208; internal volume of closed volumes 304 in flow communication with header 222; length of flow restrictors 310, 312; and inner diameter of flow restrictors 310, 312.

In various embodiments, the number of closed volumes is at least one, at least two, at least three, at least four, at least five, at least six, at least seven, and at least eight. In one embodiment, the number of closed volumes is one. In one exemplary embodiment, manifold pressure damping assembly 300 includes two closed volumes 304 as illustrated in FIG. 3.

Any of closed volumes may be located at any position on header 222 of manifold 208 without limitation. Without being limited to any particular theory, one or more closed volumes are situated near regions of header 222 characterized by pressure fluctuations over about 250 Hz frequency and/or near regions thought to contribute to the formation of pressure fluctuations over about 250 Hz frequency. In one aspect, manifold pressure damping assembly 300 includes closed volumes 304 at opposite ends of header 220. In this aspect, manifold pressure damping assembly 300 includes first closed volume 304 coupled in flow communication with manifold 208 at first end 218 through first flow restrictor 310. Also in this aspect, manifold pressure damping assembly 300 further includes second closed volume 304 coupled in flow communication with manifold 208 at second end 220 through second flow restrictor 312.

The internal volume of any closed volume 304 may be any volume suitable for damping acoustic oscillations greater than about 250 Hz without limitation. In one aspect, the internal volume of any closed volume 304 may be selected to fit within the available space within combustion assembly 110. In an exemplary aspect, the internal volume of each closed volume 304 of manifold pressure damping assembly 300 ranges from about 0.5 in3 (about 8.2 cm3) to about 1 in3 (about 16.4 cm3). In various aspects, closed volume 304 may have any shape without limitation including, but not limited to cubic, spherical, cylindrical, and any other suitable shape without limitation. In various other aspects, closed volumes 304 may be provided with insulation to inhibit coking.

Flow restrictors 310, 312 include any conduit suitable for coupling closed volumes 304 to header 222 in flow communication characterized by an internal diameter that is smaller than a corresponding internal diameter of header 222. Without being limited to any particular theory, closed volumes 304 and flow restrictors 310, 312 together function as Helmholtz resonator dampers in which impedance induced by inertia of fluid within flow restrictors 310, 312 coupled with compression and expansion of fluid within closed volumes 304 combine to dampen pressure oscillations within header 222. In various other aspects, flow restrictors 310, 312 may be provided with insulation to inhibit coking.

In various aspects, the length and inner diameter of flow restrictors 310, 312 may be any suitable size for dampening pressure oscillations within header 222 without limitation. Non-limiting examples of suitable flow restrictors 310, 312 include a tube having a diameter smaller than a diameter of header 222, an orifice plate, and any combination thereof. In one exemplary embodiment, flow restrictors 310, 312 are tubes having an inner diameter ranging from about 0.02 inches (0.051 cm) to about 0.03 inches (0.076 cm).

In various embodiments, manifold pressure damping assembly 300 may be incorporated into the design of any fluid delivery system that includes a manifold 208 without limitation including, but not limited to, fuel delivery system 200 of combustion assembly 108 within a turbofan engine 100. FIG. 4 is a schematic view of a manifold pressure damping assembly 400 coupled in flow communication with a header 222 of manifold 208. In this embodiment, header 222 of manifold 208 includes one or more inlet openings 214 coupled in flow communication with a source of fluid 224 distributed by header 222. Non-limiting examples of suitable sources of fluid 224 include fuel tanks. Header 222 further includes one or more output openings 216 configured to distribute the fluid from header 222 to one or more respective loads 226. Non-limiting examples of suitable loads 226 include fuel nozzles.

In various additional embodiments, manifold pressure damping assembly 300 may be used in a method of damping pressure fluctuations within a manifold. In one embodiment, the method includes coupling one or more closed volumes in flow communication with the manifold through one or more flow restrictors, as described herein previously. In one exemplary embodiment, coupling the one or more closed volumes in flow communication with the manifold includes coupling a first closed volume in flow communication with the first end of the elongate header through a first flow restrictor and coupling a second closed volume in flow communication with the second end of the elongate header through a second flow restrictor as described herein previously. In one aspect, the method may further include insulating the one or more closed volumes and/or one or more flow restrictors to prevent coking.

Exemplary embodiments of manifold pressure damping systems are described above in detail. The manifold pressure damping systems, and methods of operating such systems and component devices are not limited to the specific embodiments described herein, but rather, components of the systems and/or steps of the methods may be utilized independently and separately from other components and/or steps described herein. For example, the methods may also be used in combination with other systems requiring a transfer of fluid from one or more fluid sources to one or more loads by way of a manifold, and are not limited to practice with only the systems and methods as described herein. Rather, the exemplary embodiment can be implemented and utilized in connection with many other machinery applications that are currently configured to receive and accept manifold pressure damping systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A manifold pressure damping assembly comprising a manifold and one or more fixed closed volumes coupled in flow communication with said manifold through one or more flow restrictors, wherein said manifold comprises a first end, an opposing second end and an elongate header extending therebetween; said header comprises one or more inlet openings coupled in flow communication with a source of fluid distributed by said header, said header further comprises one or more output openings configured to distribute the fluid to one or more respective loads;

wherein the manifold pressure damping assembly operates in a passive manner without control or modulation, and wherein each flow restrictor of said one or more flow restrictors comprises a tube having a diameter smaller than a diameter of said header.

2. The assembly of claim 1, wherein at least one of said one or more respective loads induces an acoustic pressure oscillation in said header.

3. The assembly of claim 2, wherein said fixed closed volumes are configured to dampen said acoustic pressure oscillation.

4. The assembly of claim 1, wherein each flow restrictor of said one or more flow restrictors consists of the tube having a diameter smaller than a diameter of said header.

5. The assembly of claim 1, further comprising insulation enclosing said one or more fixed closed volumes and said one or more flow restrictors.

6. The assembly of claim 1, wherein said one or more loads comprise one or more fuel nozzles.

7. A method of damping pressure fluctuations within a manifold, the method comprising coupling one or more fixed closed volumes in flow communication with the manifold through one or more flow restrictors, wherein said manifold comprises a first end, an opposing second end and an elongate header extending therebetween; said header comprises one or more inlet openings coupled in flow communication with a source of fluid distributed by said header, said header further comprises one or more output openings configured to distribute the fluid to one or more respective loads;

whereby the one or more fixed closed volumes and the one or more flow restrictors are sized and positioned to self-dampen pressure oscillations within a desired frequency range at a suitable location within the manifold, and wherein each flow restrictor of said one or more flow restrictors comprises a tube having a diameter smaller than a diameter of said header.

8. The method of claim 7, further comprising reducing an acoustic pressure oscillation in the header using the one or more fixed closed volumes in flow communication with the manifold through at least one of the one or more respective loads.

9. The method of claim 7, wherein coupling one or more fixed closed volumes in flow communication with the manifold through one or more flow restrictors comprises coupling one or more fixed closed volumes in flow communication with the manifold through one or more flow restrictors consisting of the tube having a diameter smaller than a diameter of the header.

10. The method of claim 7, wherein coupling the one or more fixed closed volumes in flow communication with the manifold comprises:

coupling a first fixed closed volume in flow communication with the first end of the elongate header through a first flow restrictor; and coupling a second fixed closed volume in flow communication with the second end of the elongate header through a second flow restrictor.

11. The method of claim 7, further comprising insulating the one or more fixed closed volumes and the one or more flow restrictors.

12. A turbofan engine comprising a manifold pressure damping assembly, said manifold pressure damping assembly comprising a manifold and one or more fixed closed volumes coupled in flow communication with said manifold through one or more flow restrictors, said manifold comprising a first end, an opposing second end and an elongate header extending therebetween, said header comprising one or more inlet openings coupled in flow communication with a source of a fuel distributed by said header, said header further comprising one or more output openings configured to distribute said fluid to one or more respective fuel nozzles;

wherein the manifold pressure damping assembly operates in a passive manner without control or modulation, and wherein each flow restrictor of said one or more flow restrictors comprises a tube having a diameter smaller than a diameter of said header.

13. The engine of claim 12, wherein each flow restrictor of said one or more flow restrictors consists of the a tube having a diameter smaller than a diameter of said header.

14. The engine of claim 12, wherein said one or more one or more fixed closed volumes comprise:

a first fixed closed volume coupled in flow communication with said first end of said elongate header through a first flow restrictor; and a second fixed closed volume coupled in flow communication with said second end of said elongate header through a second flow restrictor.

15. The engine of claim 14, wherein each of said one or more flow restrictors comprise a tube having an inner diameter ranging from 0.02 inches to 0.07 inches.

16. The engine of claim 15, wherein said each of said one or more flow restrictors comprise a tube having an inner diameter ranging from 0.02 inches to 0.03 inches and each of said one or more fixed closed volumes comprise a fixed enclosed volume ranging from 0.5 $in^3$ to 1 $in^3$.

17. The engine of claim 12, further comprising insulation enclosing said one or more fixed closed volumes and said one or more flow restrictors.

* * * * *